United States Patent [19]

Dietz et al.

[11] Patent Number: 5,123,966
[45] Date of Patent: Jun. 23, 1992

[54] MIXED CRYSTAL PIGMENTS BASED ON HALOGENATED PERYLENETETRACARBOXIMIDES

[75] Inventors: Erwin Dietz, Kelkheim; Manfred Urban, Wiesbaden, both of Fed. Rep. of Germany

[73] Assignee: Hoechst Aktiengesellschaft, Frankfurt am Main, Fed. Rep. of Germany

[21] Appl. No.: 626,570

[22] Filed: Dec. 12, 1990

Related U.S. Application Data

[63] Continuation of Ser. No. 426,888, Oct. 25, 1989, abandoned.

[30] Foreign Application Priority Data

Oct. 27, 1988 [DE] Fed. Rep. of Germany ....... 3836536

[51] Int. Cl.⁵ .......................... C08K 5/34; C09B 67/20
[52] U.S. Cl. ................... 106/498; 106/493; 106/494; 106/287.21; 8/657; 546/37
[58] Field of Search .............. 106/498, 287.21, 494, 106/493; 546/37; 8/657

[56] References Cited

U.S. PATENT DOCUMENTS

| | | | |
|---|---|---|---|
| 3,554,776 | 1/1971 | Gerson et al. | 106/494 |
| 3,615,800 | 10/1971 | Spietschka et al. | 106/498 |
| 4,256,507 | 3/1981 | Kranz et al. | 106/495 |
| 4,431,806 | 2/1984 | Spietschka et al. | 106/498 |
| 4,846,892 | 7/1989 | Henning et al. | 546/37 |

FOREIGN PATENT DOCUMENTS

| | | |
|---|---|---|
| 0039912 | 11/1981 | European Pat. Off. |
| 1619531 | 2/1971 | Fed. Rep. of Germany |
| 3631678 | 3/1988 | Fed. Rep. of Germany |

*Primary Examiner*—William R. Dixon, Jr.
*Assistant Examiner*—Anthony J. Green

[57] ABSTRACT

In the art of pigmenting high molecular weight organic materials there is a long-felt need for high-hiding organic red pigments, in particular yellowish red pigments, which are increasingly used to replace the ecologically unsafe inorganic red pigments. However, this gap in the market cannot be satisfactorily filled by using the tetrachloroperylenetetracarboximide pigments known for the aforementioned purpose.

According to the invention, it has now been found that a chlorine content of $\leq 25\%$ in such chlorinated perylimides confers remarkable coloristic properties on the pigments thus produced, so that these pigments are superior in hiding powder and masstone to the tetrachloroperylimide compounds described. Accordingly, the invention is directed to high-hiding red pigments of the type of the halogenated perylenetetracarboximides containing up to 4 chlorine atoms, whose chlorine content is 15-25% and which are present as mixed crystal pigments in the $\beta$-modification with an average particle size of ideally $\geq 0.15$ μm. Perylimide compounds having a higher chlorine content favor the simultaneous formation of the $\alpha$-phase.

17 Claims, No Drawings

MIXED CRYSTAL PIGMENTS BASED ON HALOGENATED PERYLENETETRACARBOXIMIDES

This is a continuation application of copending U.S. patent application, Ser. No. 07/426,888, filed on Oct. 25, 1989, now abandoned.

The present invention relates to novel mixed crystal pigments based on halogenated perylene-3,4,9,10-tetracarboximides and the use thereof as colorants for pigmenting high molecular weight organic materials.

Halogen compounds from the class of the perylenetetracarboximides, or perylimides for short, have long been known in the art and are produced on an industrial scale.

Congeneric pigments of the perylimide type, and chlorination and bromination products derived therefrom, can be prepared, for example as described in EP-B-0,039,912, by conversion of the possibly halogenated crude pigment into the sulfate and subsequent hydrolysis to the pure pigment. After milling and conditioning, they are notable for extremely high transparence, high color strength and small average pigment particle diameters. The weather resistance of pigments thus obtained is not wholly satisfactory, owing to the small particle size.

DE-C-3,631,678 likewise concerns perylimide pigments which are more than 85% by weight tetrachloro compound. However, the method described therein for preparing such highly halogenated pigments is very difficult to realize under production conditions, since the precipitation of the tetrachloroperylimide in a finely divided form by the very rapid addition of water to the (sulfuric acid) monohydrate-rich chlorination mixture at a constant, low temperature is difficult to control on an industrial scale. Moreover, it is in most cases not an easy matter to convert the pigments thus obtainable safely into the $\beta$-modification in the required order of magnitude (above 95% by weight).

Despite intensive efforts in this field to complete the range of such colorants as regards the shades desired by the consumer, there is still a large demand in the pigmenting of high molecular weight organic materials for high-hiding organic red pigments, in particular yellowish red pigments, which are increasingly used to replace the ecologically unsafe inorganic red pigments. However, this gap in the market has hitherto not been satisfactorily filled by those tetrachloroperylimide pigments which are usable for the aforementioned purpose.

It has now been found that, in the case of high-hiding red pigments based on halogenated perylenetetracarboximides with up to 4 chlorine atoms, a chlorine content of less than or equal to 25.2% leads to pigments having excellent coloristic properties, which in hiding power and masstone are distinctly superior to the tetrachloroperylenetetracarboximide pigments described in DE-C-3,631,678. Pigments of this type, which are formed in the course of the chlorination of pure perylimide in sulfuric acid monohydrate, are composed of a mixture of essentially tri- and tetrachloroperylimide. After they have been synthesized, they are relatively easily convertible, with or without intermediary isolation, into coloristically interesting pigmentary forms of high hiding power, especially the $\beta$-modification thereof, by the various comminution and conditioning techniques. By contrast, uniform and complete conversion into the $\beta$-crystal phase is very difficult to accomplish in the case of perylenetetracarboximides having a higher chlorine content.

At the same time it has been found according to the invention that two or more differently halogenated perylenetetracarboximides, differently halogenated in terms of the number and/or the nature of the halogen substituents on the polycyclic system, can be combined with one another to form mixed crystals or solid solutions. Similarly to the abovementioned chlorination products, it is also possible to use brominated perylenetetracarboximides for mixed crystal formation.

Mixed crystal in this context denotes that one or more components added to the base pigment are present in the crystal lattice of the host compound. The X-ray diffraction diagram of a mixed crystal then only shows the frequently expanded crystal lattice of the host compound, whereas in the case of the corresponding physical mixture all the components are separately detectable in the diagram.

Mixed crystal formation distinctly increases the number of applications for which halogenated perylenetetracarboximide compounds may be used as pigmenting colorants. The properties of these mixed crystal pigments differ appreciably from those of the corresponding physical mixtures of the individual components. They show in particular higher hiding power and purer hues. The fastness properties thereof are excellent.

The present invention accordingly provides a mixed crystal pigment based on halogenated perylene-3,4,9,10-tetracarboximides (perylimides), essentially formed from two or more individual components of the general formula I

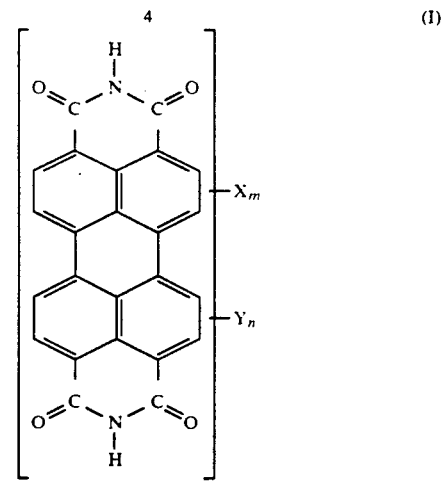

where X is chlorine, Y is bromine and m and n are each integers from 0 to 4, but cannot both be zero wherein the total chlorine content of the mixed crystal is ≦25.2% by weight and the mixed crystal is predominantly or wholly present in the $\beta$-modification and has an average particle size of $\geq 0.15$ $\mu$m.

The starting material for preparing the mixed crystal pigment according to the invention, which is composed of individual compounds of the general formula I, is perylene-3,4,9,10-tetracarboximide (C.I. Pigment Violet 29 -No. 71129), which can be obtained in the pure form for example by the method described in EP-B-0,039,912 by treatment of crude perylimide with concentrated sulfuric acid or by the method described in DE-A-1,619,531 by condensation of the parent perylenetetracarboxylic acid with ammonia in aqueous solution. Mixed crystal formation takes place thereafter in the course of the halogenation, specifically chlorination or bromination, of the perylimide obtainable in pure form by the two above methods, or it is brought about specifically in the synthesis of different individual compounds of the formula I by dissolving mixtures thereof together in an inert organic solvent by heating and recrystallizing them by cooling, or by subjecting mixtures of finely divided crude pigments to conditioning.

The mixed crystal compounds of halogenated perylimides in question here, however, are generally obtained from their synthesis as coarsely crystalline crude pigments. In this state, they are still unsuitable for use in the pigment field, and must first be specially prepared by chemical and/or physical aftertreatment operations for the purposes of improving the coloristic properties, which can be done in a multiplicity of ways.

High-hiding forms of the novel mixed crystal pigments according to the invention, which meet the previously indicated characteristic features in respect of chlorine content, crystal modification and particle size, are obtained on subjecting the abovementioned crude pigments to a specifically adapted comminution and conditioning process. This intention can be realized by first converting two or more finely or coarsely crystalline perylimide individual components of the formula I which differ from one another in respect of their chemical structure, or coarsely crystalline perylimide mixed crystal compounds formed from such different individual components of the formula I into the corresponding finely divided perylimide mixed crystal compounds by (1) bead milling in a liquid medium, for example water or inert organic solvents such as aliphatic carboximides,
(2) dry milling in the presence or absence of salt, for example inorganic salts, such as sodium sulfate, sodium chloride, calcium chloride or aluminum sulfate,
(3) dissolving in a concentrated inorganic acid, for example sulfuric acid monohydrate, and subsequent hydrolyzing by pouring the solution into water or dilute acids to bring down a precipitate, or
(4) suitable synthesis management, where the reaction conditions are chosen in such a way that the perylimide mixed crystal compounds formed are present in the dissolved state after halogenation and are precipitated by combining the solution with water, and subsequently converting these by conditioning in an inert organic solvent or in a dilute inorganic acid at temperatures of 50° to 200° C., preferably of 80° to 160° C., into the perylimide mixed crystal pigments composed of individual components of the general formula I.

The aftertreatment of the mixed crystal compounds by heating in a solvent may also take place under superatmospheric pressure. Preferably, the conditioning is carried out using organic solvents of a polar nature whose boiling points are above 75° C. Suitable solvents of this type are inter alia the following: ketones such as cyclohexanone, ethers, glycols and glycol ethers such as methoxypropanol, methoxybutanol, diethylene glycol, dipropylene glycol, ethyl diglycol or butyl diglycol, aromatic hydrocarbons such as toluene, xylenes or ethylbenzene, aromatic chlorohydrocarbons such as chlorobenzene, o-dichlorobenzene, 1,2,4-trichlorobenzene or bromobenzene, aromatic nitro compounds such as nitrobenzene or nitrophenol, phenol, aromatic carboxylic acids and esters thereof, such as $C_1$-$C_4$-alkyl benzoates, heterocyclic bases such as pyridine, picolines, quinoline or morpholine, and sulfur-containing solvents such as dimethyl sulfoxide or tetramethylene sulfone (sulfolane). But particularly suitable solvents for this purpose are aliphatic carboxamides, such as N-methylpyrrolidone, formamide and dimethylformamide.

Another suitable conditioning medium is a dilute inorganic acid, in particular dilute sulfuric acid.

The comminution and conditioning of the mixed crystal crude pigments can be carried out in the presence of surface-active agents. Suitable surface-active compounds for this purpose are anionic, cationic, nonionic and/or amphoteric surfactants.

The conditioning may be carried out in stirred vessels. However, if necessary, it can also be carried out by the action of shearing forces in milling or kneading apparatus.

The proportions of the differently halogenated perylenetetracarboximides of the general formula I in the mixed crystal pigments can vary within a wide range. In general, every individual component is present in an amount of 1 to 99%, based on the total weight of the mixed crystal. Preferably, however, one of the individual components is present in a weight proportion of 70 to 95%. Chemically, the structural elements making up the mixed crystal pigments are first and foremost monochloro-, dichloro-, trichloro-, tetrachloro-, monobromo- and dibromo-perylenetetracarboximides, mixed chlorobromoperylenetetracarboximides and unsubstituted perylenetetracarboximide. Particular preference is given to mixed crystal pigments which have a total chlorine content of 15.0 to 25.2% by weight and are formed from perylenetetracarboximide and monochloro-, dichloro-, trichloro- and tetrachloroperylenetetracarboximides, but which essentially constitute a mixture of tri- and tetrachloroperylimide. In the case of bromine, the preferred range is a total bromine content between 20 and 30% by weight.

By contrast, perylenetetracarboximide compounds containing more than 4 chlorine atoms in the molecule favor the formation of the coloristically uninteresting α-crystal modification, and have an adverse effect on the application properties of pigments formed on such a basis.

A particularly crucial factor for the coloristic effect of the mixed crystal pigments according to the invention is their average particle diameter, which according to the invention is $\geq 0.15$ μm. More particularly, having regard to the intended use of the products, a particle size distribution within the range from 0.15 μm to 0.5 μm, preferably between 0.15 μm and 0.3 μm, is considered indispensable.

The halogenated perylenetetracarboximide mixed crystals according to the present invention are red to reddish violet pigments which have excellent rheological properties and produce colorings of high brilliance, high hiding power and outstanding fastness properties.

The mixed crystal pigments according to the invention are usable for pigmenting high molecular weight organic materials of natural or synthetic origin: High molecular weight organic materials which can be colored with the claimed mixed crystal pigments are for example cellulose ethers and esters, such as ethylcellulose, nitrocellulose, cellulose acetate or cellulose butyrate, natural or synthetic resins, such as polymerization or condensation resins, e.g. aminoplasts, in particular urea- and melamine-formaldehyde resins, alkyd resins, acrylic resins, phenoplasts, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or mixed.

It is immaterial here whether the high molecular weight organic compounds mentioned are present as plastic masses, as melts or in the form of spinning solutions, coatings, paints or printing inks. Depending on the intended use, it is found to be advantageous to use the pigments which are to be used according to the invention as toners or in the form of preparations or dispersions. Based on the high molecular weight organic material to be pigmented, the claimed mixed crystal pigments are used in an amount of preferably 0.1 to 10% by weight.

Particularly preferred coating systems in this respect are baking finishes based on alkyd/melamine resin and acrylic/melamine resin lacquers and two-component coating compositions based on polyisocyanate-crosslinkable acrylic resins and waterborne lacquer systems. After pigment incorporation and surface application of the coating systems, the coatings obtained are coloristically strong, pure and high-gloss and show very good weather resistance. The mixed crystal pigments prepared according to the invention have very good flow characteristics in modern coating systems, even at high pigment concentrations, combined with excellent antiflocculation stability.

The mixed crystal pigments according to the present invention, being polymer-soluble colorants, are also highly suitable for coloring formable plastics, in particular polyolefins such as polyethylene, polypropylene, polyvinyl chloride and polystyrene. The mixed crystal pigments are very readily dispersible in these plastics, where they give brilliant and strong colorings.

To assess the properties of the claimed mixed crystal pigments in coating systems, two were selected from the large number of known systems: on the one hand an alkyd/melamine resin lacquer (AM6) based on a medium-oil, non-drying alkyd resin formed from synthetic fatty acids and phthalic anhydride and a butanol-etherified melamine resin and proportions of a non-drying alkyd resin based on ricinenic acid (short-oil), and on the other an acrylic resin baking finish based on a non-aqueous dispersion (TSA-NAD). These test systems will be referred to in the Examples below as AM6 and TSA-NAD respectively.

The rheology of the mill base after dispersion is rated against the following five-point scale:

| | |
|---|---|
| 5 mobile | 2 slightly set |
| 4 fluid | 1 fully set |
| 3 viscous | |

After the mill base had been diluted to the final pigment concentration, the viscosity was determined using a Rossmann viscospatula, model 301, from Erichsen.

Gloss measurements were carried out on cast films at an angle of 20° in accordance with German Standard Specification DIN 67530 (ASTM D 523) using the "multigloss" meter from Byk-Mallinckrodt. The average particle size was determined from electron micrographs.

In the Examples below, parts and percentages are by weight.

EXAMPLE 1

80 g of halogen-free perylene-3,4,9,10-tetracarboxidiimide, prepared as pure perylimide as described in Example 1a) of EP-B-0,039,912, are added at 25° C. to 2,400 g of 100% strength sulfuric acid and dissolved therein. 10 g of iodine are then added, and the batch is heated to 80°-90° C. At this temperature 76 g of chlorine are then passed in over 3½ hours, the chlorination mixture is then cooled down to 25° C., and 600 g of 50% strength sulfuric acid are added dropwise. Thereafter the precipitated reaction product is filtered off with suction and washed with 78% strength sulfuric acid. The residue is then washed with water until neutral and dried at 80° C.

104.4 g are obtained of chlorinated perylenetetracarboximide as a coarsely crystalline crude pigment having a chlorine content of 25.1%.

The chlorine content determination (HPLC analysis in tetrahydrofuran on a Latek column 250×4 C 18 Go/R5 μm and UV detector at 513 nm) gives the following values: 17% of trichloroperylenetetracarboximide, 81% of tetrachloroperylenetetracarboximide and 2% of pentachloroperylenetetracarboximide.

Mass spectroscopy gives the following values: 16% of trichloroperylenetetracarboximide, 80% of tetrachloroperylenetetracarboximide and 4% of pentachloroperylenetetracarboximide.

20 g of the chlorinated perylenetetracarboximide previously isolated as a coarsely crystalline crude pigment are introduced together with 200 ml of dimethylformamide into a 1-liter porcelain vessel filled with 1,200 g of quartzite beads (3 mm in diameter) as grinding medium, and are fine-ground therein for 12 hours by shaking on a vibrating mill (model ®Vibratom from Siebtechnik Mülheim). The resulting pigment suspension is subsequently sieved off, and the quartzite beads are washed with dimethylformamide. The collected mill base is then diluted with water and filtered with suction, and the filter residue is washed with water until free of dimethylformamide and dried at 80° C.

19.2 g are obtained of a mixed crystal pigment in the β-phase having an average particle size of 0.21 μm.

The pigment is tested in AM6 lacquer, giving brilliant, red and high-hiding coatings of satisfactory overpainting fastness. The mill base rheology of the 15% strength product is rated 5. The viscosity of the 5% strength coating composition is 2.4".

EXAMPLE 2

30 g of chlorinated perylene-3,4,9,10-tetracarboximide in the form of the coarsely crystalline crude pigment having a chlorine content of 25.1%, produced as described in Example 1, are mixed with 150 g of anhydrous sodium sulfate, and the mixture is introduced into a 1-liter porcelain vessel filled with 1,300 g of porcelain balls (12 mm in diameter) as grinding medium. This batch is then fine-ground for 4 hours by shaking on a vibrating mill (of the same type as in Example 1). The mill base is then sieved, stirred up with water and filtered with suction, and the filter residue is washed with water until sulfate-free and dried at 80° C.

21.5 g are obtained of a mixed crystal pigment in the β-phase.

Its X-ray diffraction spectrum has the following main lines 2 $\theta CuK_\alpha$:

Strong lines: 25.59;
Medium lines: 8.97, 16.80, 19.03, 21.51, 24.21, 26.43, 27.09, 27.60
Weak lines: 13.25, 15.02.

The average particle size of the product is 0.175 μm.

The pigment is tested in AM6 lacquer, giving brilliant, red and high-hiding coatings of satisfactory overpainting fastness.

The mill base rheology of the 15% strength product is rated 4-5. The viscosity of the 5% strength coating composition is 2.9".

EXAMPLE 3

30 g of chlorinated perylene-3,4,9,10-tetracarboximide in the form of a coarsely crystalline crude pigment having a chlorine content of 24.1% obtained as described in Example 1 are mixed with 150 g of anhydrous sodium sulfate, the mixture is then introduced into a 1-liter porcelain vessel filled with 1,300 g of porcelain balls (12 mm in diameter) as grinding medium, and this batch is then fine-ground for 4 hours by shaking on a vibrating mill (of the same type as in Example 1). The mill base is then sieved off, stirred up with water and then filtered with suction, and the filter residue is washed with water until sulfate-free and dried at 80° C. 28.5 g of a finely divided crude pigment are obtained.

22 g of the previously isolated finely divided crude pigment are then added with stirring to 220 ml of dimethylformamide. The mixture is then heated to 100° C. and stirred at that temperature for 2 hours. It is then cooled down to 25° C., and the conditioned product is filtered off with suction, washed with water until free of dimethylformamide and dried at 80° C.

21.7 g are obtained of a mixed crystal pigment in the β-phase having an average particle size of 0.27 μm. The pigment is tested in AM6 lacquer, giving brilliant, red and high-hiding coatings of satisfactory overpainting fastness. The mill base rheology of the 15% strength product is rated 5. The viscosity of the 5% strength coating composition is 2.7".

EXAMPLE 4

150 g of halogen-free perylene-3,4,9,10-tetracarboximide, prepared as described in DE-A-1,619,531 by a condensation of perylenetetracarboxylic acid with ammonia, are added to 1,920 g of 100% strength sulfuric acid and dissolved therein. After 2.9 g of sodium iodide have been added to the solution, 230 g of chlorine are passed in at 25° C. over 6 hours, with a further 2.9 g of sodium iodide being added after 3 hours. 1,280 g of 50% strength sulfuric acid are then added dropwise to the chlorination mixture. The reaction product precipitates and is then filtered off with suction, washed with 1,350 g of 80% strength sulfuric acid and then with water until neutral and is dried at 80° C. 180.8 g are obtained of a chlorinated perylenetetracarboximide in the form of the coarsely crystalline crude pigment having a chlorine content of 20.4%.

7.5 g of the chlorinated perylenetetracarboximide previously obtained as a coarsely crystalline crude pigment having a chlorine content of 20.4% and 22.5 g of chlorinated perylenetetracarboximide having a chlorine content of 26.8% (virtually pure tetrachloroperylimide), prepared in the form of the corasely crystalline crude pigment as described in Example 1, are mixed together with 150 g of anhydrous sodium sulfate, and the mixture is then introduced into a 1-liter porcelain vessel filled with 1,300 g of porcelain balls (12 mm in diameter) as grinding medium. This mixture of different perylimide pigments is then fine-ground for 4 hours by shaking on a vibrating mill (of the same type as in Example 1). The mill base is then sieved off, stirred up with water and filtered with suction, and the filter residue is washed with water until sulfate-free and dried at 80° C. Dry grinding gives 27.1 g of a finely divided crude pigment.

20 g of the previously isolated finely divided crude pigment are then added with stirring into 200 ml of dimethylformamide, and the mixture is heated to 100° C. and subsequently stirred at that temperature for 2 hours. It is then cooled down to 25° C., and the conditioned product is filtered off with suction, washed with water until free of dimethylformamide and dried at 80° C. 19.2 g are obtained of a mixed crystal pigment in the β-phase having an average particle size of 0.22 μm.

The pigment is tested in AM6 lacquer, giving brilliant, red and high-hiding coatings of satisfactory overpainting fastness. The mill base rheology of the 15% strength product is rated 5. The viscosity of the 5% strength coating composition is 2.7". The gloss measurement gives a value of 82.

Comparison a)

If instead of the above-discussed crude pigment mixture of differently chlorinated constituents only the coarsely crystalline chlorinated perylenetetracarboximide crude pigment specified in this connection and with a chlorine content of 20.4% is subjected to the comminution and conditioning process described above, the result obtained is a mixed crystal pigment which in the X-ray diagram shows besides the β-phase the existence of another phase (foreign lines) and has an average particle size of 0.06 μm.

This comparative sample is tested in AM6 lacquer, giving brilliant, red and transparent coatings of high color strength. The mill base rheology of the 15% strength product is rated 1-2. The viscosity of the 5% strength coating composition is 3.5". The gloss value is 88.

Comparison b)

If instead of the above-discussed crude pigment mixture of differently chlorinated constituents only the coarsely crystalline chlorinated perylenetetracarboximide crude pigment with a chlorine content of 26.8% (nearly pure tetrachloroperylimide) specified in this connection and prepared as described in Example 1 is subjected to the comminution and conditioning process described above, the result obtained is a pigment which is in the β-phase and has an average particle size of 0.16 μm.

Incorporated in an AM6 test lacquer, this comparative sample is much more transparent and darker than the mixed crystal pigment of Example 1 according to the invention with a chlorine content of 25.1%. The mill base rheology of the 15% strength product is rated 5. The viscosity of the 5% strength coating composition is 2.8".

EXAMPLE 5

15 g of chlorinated perylene-3,4,9,10-tetracarboximide in the form of the coarsely crystalline crude pigment having a chlorine content of 20.4%, prepared as described in Example 4 above, and 15 g of chlorinated perylenetetracarboximide having a chlorine content of 26.8% (nearly pure tetrachloroperylimide), prepared as coarsely crystalline crude pigment as described in Example 1, are mixed together with 150 g of anhydrous sodium sulfate, and the mixture is introduced into a 1-liter porcelain vessel containing 1,300 g of porcelain balls (12 mm in diameter) as grinding medium. The mixture of the different perylimide pigments is then fine-ground for 4 hours by the action of a vibrating mill (of the same type as in Example 1). The mill base is then sieved off, stirred up with water and then filtered off with suction, the filter residue is washed with water until sulfate-free and dried at 80° C. This gives 26.3 g of a finely divided crude product.

20 g of the previously isolated finely divided crude pigment are then added with stirring to 200 ml of dimethylformamide. The mixture is heated to 100° C. and is subsequently stirred at that temperature for 2 hours. It is then cooled down to 25° C., and the conditioned product is filtered off with suction, washed with water until dimethylformamide-free and dried at 80° C.

18.7 g are obtained of a mixed crystal pigment in the $\beta$-phase having an average particle size of 0.29 $\mu$m.

The pigment is tested in AM6 lacquer, giving brilliant, red and high-hiding coatings of satisfactory overpainting fastness. The mill base rheology of the 15% strength product is rated 5. The gloss measurement gives a value of 87.

EXAMPLE 6

150 g of halogen-freeperylene-3,4,9,10-tetracarboximide, prepared as described in DE-A-1,619,531 by condensation of perylenetetracarboxylic acid with ammonia, are added to 1,920 g of 100% strength sulfuric acid and dissolved therein. After 3 g of sodium iodide have been added to the solution, 273 g of chlorine are passed in at 25° C. over 9 hours, with further 3 g portions of sodium iodide being added after 3 and 6 hours. Thereafter 1,280 g of 50% strength sulfuric acid are added dropwise to the chlorination mixture. The reaction product precipitates and is subsequently filtered off with suction, washed with 1,350 g of 80% strength sulfuric acid and then with water until neutral, and dried at 80° C. 183.4 g are obtained of a chlorinated perylenetetracarboximide in the form of the coarsely crystalline crude pigment having a chlorine content of 25.1%.

30 g of the chlorinated perylenetetracarboximide isolated above as coarsely crystalline crude pigment having a chlorine content of 25.1% are mixed with 150 g of anhydrous sodium sulfate, and the mixture is introduced into a 1-liter porcelain vessel containing 1,300 g of porcelain balls (12 mm in diameter) as grinding medium, and the batch is then fine-ground for 4 hours by shaking on a vibrating mill (of the same type as in Example 1). The mill base is then sieved off, stirred up with water and then filtered off with suction, the filter residue is washed with water until sulfate-free and dried at 80° C.

27.9 g are obtained of a finely divided crude pigment.

24 g of the above finely divided crude pigment are then added with stirring into 220 ml of dimethylformamide. The mixture is then heated to 100° C. and is subsequently stirred at that temperature for 2 hours. It is then cooled down to 25° C., and the conditioned product is filtered off with suction, washed with water until free of dimethylformamide and dried at 80° C.

23.1 g are obtained of a mixed crystal pigment in the $\beta$-phase having an average particle size of 0.26 $\mu$m. The pigment is tested in AM6 lacquer, giving brilliant, red and high-hiding coatings of satisfactory overpainting fastness. The mill base rheology of the product is rated 5.

EXAMPLE 7

25 g of halogen-free perylene-3,4,9,10-tetracarboximide, prepared as described in DE-A-1,619,531 by condensation of perylenetetracarboxylic acid with ammonia, are added to 320 g of sulfuric acid monohydrate and dissolved therein. 0.5 g of sodium iodide is added, and 44.5 g of chlorine are then passed in at 25° C. over 9 hours with a further 0.5 g of sodium iodide being added after 3 and after 6 hours. After the chlorination process has ended, the mixture is cooled down to 20° C. and 80 ml of water are then added dropwise at 20°-30° C. with thorough cooling in the course of 10 minutes. The reaction mixture is then heated to 120° C. and subsequently stirred at that temperature for 3 hours. After cooling down to 60° C., the precipitated product is filtered off with suction and washed with 125 g of 80% strength sulfuric acid and then with water until neutral, and dried at 80° C.

29.5 g are obtained of a mixed crystal pigment in the $\beta$-phase having an average particle size of 0.21 $\mu$m. The pigment is tested in AM6 lacquer, giving brilliant, red and high-hiding coatings of satisfactory overpainting fastness. The mill base rheology of the 15% strength product is rated 5.

EXAMPLE 8

36 g of chlorinated perylene-3,4,9,10-tetracarboximide as crude pigment having a chlorine content of 26.8% and 4 g of brominated perylene-3,4,9,10-tetracarboximide as crude pigment having a bromine content of 25.45%, both prepared in the coarsely crystalline state as described in EP-B-0,039,912, are added at 25° C. to 800 g of 100% strength sulfuric acid and dissolved therein, and 533 g of 50% strength sulfuric acid are added dropwise to the solution. A solid product precipitates, which is filtered off with suction, then washed with 240 g of 80% strength sulfuric acid and thereafter with water until neutral, and dried at 80° C. 38.4 g are obtained of a mixed-halogenated perylenetetracarboximide in the form of the coarsely crystalline crude pigment.

30 g of the above mixed-halogenated perylenetetracarboximide in the form of the coarsely crystalline crude pigment are mixed with 150 g of anhydrous sodium sulfate, and the mixture is introduced into a 1-liter porcelain vessel containing 1,300 g of porcelain balls (12 mm in diameter) as grinding medium. The mixture is then fineground for 4 hours by shaking on a vibrating mill (of the same type as in Example 1). The resulting mill base is sieved off, stirred up with water and then filtered with suction, and the filter residue is washed with water until sulfate-free and dried at 80° C. This dry grinding produces 27.9 g of finely divided crude pigment.

24 g of the above isolated finely divided crude pigment are then added with stirring to 220 ml of dimethylformamide, and the mixture is heated to 100° C. and stirred at that temperature for 2 hours. It is then cooled down to 25° C., and the conditioned product is filtered off with suction, washed with water until dimethylformamide-free and dried at 80° C.

22.8 g are obtained of a mixed crystal pigment which is predominantly in the $\beta$-phase and has a particle size of 0.16 $\mu$m.

The pigment is tested in AM6 lacquer, giving red, high-hiding coatings. The mill base rheology of the 15% strength product is rated 5.

What is claimed is:

1. A brilliant, high-hiding, non-transparent mixed crystal pigment based on halogenated perylene-3,4,9,10-tetracarboximides (perylimides), wherein said mixed crystal is formed from two or more individual components of different structures but both corresponding to general formula I

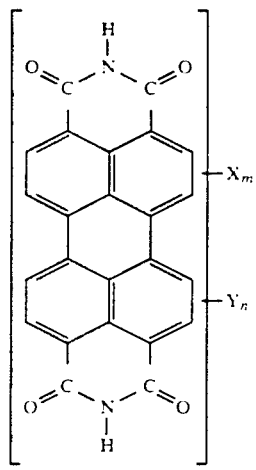

where X is chlorine, Y is bromine and m and n are each integers from 0 to 4, but cannot both be zero, wherein the total chlorine content of the mixed crystal is ≦25.2% by weight and the mixed crystal is predominantly or wholly present in the β-modification and has an average particle size of ≧0.15 μm.

2. A mixed crystal pigment as claimed in claim 1, wherein the average particle size is within the range between 0.15 μm and 0.5 μm.

3. A mixed crystal pigment as claimed in claim 1, wherein the total chlorine content of the mixed crystal is within the range between 15.0 and 25.2% by weight.

4. A mixed crystal pigment as claimed in claim 1, wherein the individual components of the formula I involved in forming the mixed crystal are essentially a mixture of tri- and tetrachloroperylimide.

5. A mixed crystal pigment as claimed in claim 1, wherein the total bromine content of the mixed crystal is within the range between 20 and 30% by weight.

6. A mixed crystal pigment as claimed in claim 1, wherein each of the individual components is present in an amount of 1% to 99%, based on the total weight of the mixed crystal.

7. A mixed crystal pigment as claimed in claim 6, wherein anyone of the individual components is present in a weight proportion of 70% to 95%.

8. A process for preparing a mixed crystal pigment as defined in claim 1, which comprises first converting two or more finely or coarsely crystalline perylimide individual components of the formula I which differ from one another in respect of their chemical structure, or coarsely crystalline perylimide mixed crystal compounds formed from individual components of the formula I, which differ from one another with respect to their chemical structure,
into the corresponding finely divided perylimide mixed crystal compounds by bead milling in a liquid medium and subsequently converting these by conditioning in an inert organic solvent or in a dilute inorganic acid at temperatures of 50° C. to 200° C. into the perylimide mixed crystal pigment composed of individual components of the general formula I.

9. The process as claimed in claim 8, wherein the conditioning is carried out at temperatures of 80° to 160° C.

10. The process as claimed in claim 8, wherein the conditioning is carried out by heating in an inert organic solvent of a polar nature, whose boiling point is above a temperature of 75° C.

11. The process as claimed in claim 8, wherein the conditioning is carried out by heating in dilute sulfuric acid.

12. The process as claimed in claim 8, wherein the conversion into the corresponding finely divided perylimide mixed crystal compounds of the crude pigments is carried out by the action of shearing forces.

13. The process as claimed in claim 8, wherein the conversion into the corresponding finely divided perylimide mixed crystal compounds and conditioning of the mixed crystal pigment is carried out in the presence of surface-active agents.

14. A mixed crystal pigment as claimed in claim 1, wherein the average particle size is within the range between 0.15 μm to 0.3 μm.

15. A process for preparing a mixed crystal pigment as defined in claim 1, which comprises first converting two or more finely or coarsely crystalline perylimide individual components of the formula I which differ from one another with respect to their chemical structure, or coarsely crystalline perylimide mixed crystal compounds formed from individual components of the formula I, which differ from one another with respect to their chemical structures into the corresponding finely divided perylimide mixed crystal compounds by dry milling in the presence or absence of an inorganic salt and subsequently converting the finely divided perylimide mixed crystal compounds by conditioning in an inert organic solvent or in a dilute inorganic acid at temperatures of 50° C. to 200° C. into the perylimide mixed crystal pigment composed of individual components of the general formula I.

16. A process for preparing a mixed crystal pigment as defined in claim 1, which comprises first converting two or more finely or coarsely crystalline perylimide individual components of the formula I which differ from one another with respect to their chemical structure, or coarsely crystalline perylimide mixed crystal compounds formed from individual components of the formula I, which differ from one another with respect to their chemical structures into the corresponding finely divided perylimide mixed crystal compounds by dissolving in concentrated inorganic acid and subsequent precipitation by pouring the solution into water or dilute acid, and subsequently converting the finely divided perylimide mixed crystal compounds by conditioning in an inert organic solvent or in a dilute inorganic acid at temperatures of 50° C. to 200° C. into the perylimide mixed crystal pigment compounds of individual components of the general formula I.

17. A process for preparing a mixed crystal pigment as defined in claim 1, which comprises first converting two or more finely or coarsely crystalline perylimide individual components of the formula I which differ from one another with respect to their chemical structure, or coarsely crystalline perylimide mixed crystal compounds formed from individual components of the formula I, which differ from one another with respect to their chemical structures into the corresponding finely divided perylimide mixed crystal compounds by choosing the reaction conditions in such a way that the perylimide mixed crystal compounds formed are present in the dissolved state after halogenation and are precipitated by combining the solution with water, and subsequently converting these finely divided perylimide mixed crystal compounds by conditioning in an inert organic solvent or in a dilute inorganic acid at temperatures of 50° C. to 200° C. into the perylimide mixed crystal pigment composed of individual components of the general formula I.

* * * * *